United States Patent [19]

Yamanouchi et al.

[11] Patent Number: 4,894,284
[45] Date of Patent: Jan. 16, 1990

[54] CROSS-LINKED POLYETHYLENE-INSULATED CABLE

[75] Inventors: Shosuke Yamanouchi, Osaka; Yoshiyuki Inoue; Masaaki Kondo, both of Kanagawa, all of Japan

[73] Assignee: Sumitomo Electric Industries, Ltd., Osaks, Japan

[21] Appl. No.: 549,843

[22] Filed: Nov. 8, 1983

[30] Foreign Application Priority Data

Nov. 9, 1982 [JP] Japan ................................ 57-197084

[51] Int. Cl.$^4$ .............................................. H01B 9/02
[52] U.S. Cl. .............................. 428/378; 174/102 SC; 174/105 SC; 174/110 PM 120 SC; 428/364; 428/375; 428/380
[58] Field of Search ................... 174/105 SC, 110 PM, 174/120 SC, 102 SC; 428/36

[56] References Cited

U.S. PATENT DOCUMENTS

| | | | |
|---|---|---|---|
| 3,513,228 | 5/1970 | Miyauchi et al. | 264/85 |
| 3,588,954 | 6/1971 | Nakamura et al. | 425/445 |
| 3,684,821 | 8/1972 | Miyauchi et al. | 174/102 SC |
| 3,717,522 | 2/1973 | Shirato et al. | 174/110 PM |
| 3,719,769 | 3/1973 | Miyauchi et al. | 174/105 SC |
| 3,769,085 | 10/1973 | Matsubara | 174/120 SC |
| 3,909,177 | 9/1975 | Takaoka et al. | 264/28 |
| 4,069,286 | 1/1978 | Greenhalgh | 264/85 |
| 4,109,098 | 8/1978 | Olsson et al. | 174/105 SC |
| 4,206,260 | 6/1980 | McMahon | 428/461 |
| 4,317,001 | 2/1982 | Silver et al. | 174/102 SC |
| 4,342,880 | 8/1982 | Castelli et al. | 174/105 SC |
| 4,360,706 | 11/1982 | Lanfranconi et al. | 174/110 PM |
| 4,400,580 | 8/1983 | Yamanouchi et al. | 174/102 SC |

*Primary Examiner*—George F. Lesmes
*Assistant Examiner*—James B. Monroe, II
*Attorney, Agent, or Firm*—Sughrue, Mion, Zinn, Macpeak & Seas

[57] ABSTRACT

A cable insulated with a cross-linked polyethylene layer is described, wherein the cross-linked polyethylene is prepared by cross-linking with 2,5-dimethyl-2-5-di(tert-butylperoxy)hexane or 2,5-dimethyl-2,5-di(tert-butylperoxy)hexyne-3 as a cross-linking agent. Even if voltage is applied at high temperatures, the breakdown voltage of the cable can be maintained at a high level.

6 Claims, No Drawings

CROSS-LINKED POLYETHYLENE-INSULATED CABLE

FIELD OF THE INVENTION

The present invention relates to a cross-linked polyethylene-insulated cable, i.e., a cable with an insulating layer of cross-linked polyethylene. More particularly, the present invention relates to a high-voltage or super high-voltage cable with an insulating layer made of cross-linked polyethylene prepared by a dry cross-linking method not using high-pressure steam.

BACKGROUND OF THE INVENTION

As an insulating material for use in solid material-insulated cables, cross-linked polyethylene prepared by chemical cross-linking, i.e., using cross-linking agents, is ordinarily used.

In this chemical cross-linking, dicumyl peroxide (DCP) is used as a cross-linking agent because of its high cross-linking efficiency and suitable decomposition temperature. In chemically cross-linked polyethylene-insulated cables, in particular, those cables in which the thickness of the insulating layer is large, if voltage is applied to at high temperatures (e.g., 90° C.), the breakdown voltage of the cables decreases even if cables are not used in the water.

In particular, in the case of cables with a metal layer as a water-shielding layer provided around an insulating layer, the breakdown voltage abruptly decreases when voltage is applied to at much higher temperatures.

The above-described problem of the decrease in breakdown voltage is encountered particularly when cross-linking is performed by a method using high pressure steam which has been generally employed. The so-called dry cross-linking method (a method of chemically cross-linking by the use of, for example, a heat transfer medium such as silicon oil, infrared radiation, hot inert gas, or a long die) can prevent the decrease in breakdown voltage of the cable with a thin insulation (less than 6 mm).

A cross-linking system for cross-linking polyethylene insulated cables using pressurized silicone oil as a medium for heating and cooling is described in U.S. Pat. No. 3,909,177.

Systems for heating cables with infrared radiation are described in U.S. Pat. Nos. 3,588,954 and 3,513,228.

Cross-linking systems using hot inert gas are described in U.S. Pat. No. 4,069,286 and IEEE Trans. Vol. PAS-94 No. 2 (1978), T74 394-3.

The above systems have been developed as a substitute for a cross-linking system using steam in order to prevent the penetration of water into an insulating layer.

However, when voltage is applied to at high temperatures, the problem of decrease in breakdown voltage cannot be overcome satisfactorily even by employing the dry cross-linking method.

SUMMARY OF THE INVENTION

An object of the invention is to provide a cross-linked polyethylene-insulated cable in which the decrease in breakdown voltage can be prevented even if electricity is applied to at high temperatures.

As a result of extensive investigations it has been found that use of certain cross-linking agents in dry cross-linking method gives rise to cross-linked polyethylene-insulated cables to prevent the decrease in breakdown voltage when the thickness of the insulating layer thereof is at least 6 mm.

The present invention is based on the finding and provides a cross-linked polyethylene-insulated cable by dry cure method comprising a conductor core, an inner semiconductive layer, an outer semiconductive layer and an insulating layer, wherein the insulating layer has a thickness of at least 6 mm and is made of a cross-linked polyethylene cross-linked with 2,5-dimethyl-2,5-di(tert-butylperoxy)hexane or 2,5-dimethyl-2,5-di(tert-butylperoxy)hexyne-3 as a cross-linking agent.

DETAILED DESCRIPTION OF THE INVENTION

In the present invention, 2,5-dimethyl-2,5-di(tert-butylperoxy)hexane or 2,5-dimethyl-2,5-di(tert-butylperoxy)hexyne-3 is used as a cross-linking agent. Even if voltage is applied at high temperatures, the breakdown voltage does not decrease.

2,5-Dimethyl-2',5'-di(tertiary butylperoxy)hexyne-3 is used as a cross-linking agent for cross-linking the semiconductive layer provided on a cross-linked polyethylene-insulated cable as described in U.S. Pat. No. 3,719,769. These cross-linking agents are more expensive than DCP and show a low cross-linking rate and, therefore, they are considered unsuitable for cross-linking cable insulators. Therefore, the effects of the cross-linking agents on the prevention of decrease in breakdown voltage have been unknown.

The cross-linked polyethylene prepared using the cross-linking agents as described above is particularly effective when it is applied to high voltage insulated cables with a thick insulation layer, for example, i.e., in which the thickness of the insulating layer is at least 6 mm.

The present invention can be much effectively applied to cables with a metal layer as a water-shielding layer.

Hence the cable of the invention is effective particularly when the cross-linking of polyethylene is performed by the dry cross-linking method.

In the present invention, the cross-linked polyethylene for use as the insulating layer may contain, if necessary, antioxidants and so forth.

The present invention is described in greater detail with reference to the following Examples and Comparative Examples.

EXAMPLES 1 to 6 and COMPARATIVE EXAMPLES 1 to 9

The following compositions were prepared:

|  | parts by weight |
|---|---|
| Composition I: | |
| Low density polyethylene (NUC 9025, produced by Nippon Unicar Co., Ltd.) | 100 |
| Dicumyl peroxide (cross-linking agent) | 2 |
| 4,4'-Thiobis(6-tert-butyl-3-methylphenol) | 0.2 |
| Composition II: | |
| Low density polyethylene (same as used above) | 100 |
| 2,5-Dimethyl-2,5-di(tert-butylperoxy)hexane (cross-linking agent) | 2 |
| 4,4'-Thiobis(6-tert-butyl-3-methylphenol) | 0.2 |
| Composition III: | |
| Low density polyethylene | 100 |

-continued

| | parts by weight |
|---|---|
| (same as used above) 2,5-Dimethyl-2,5-di(tert-butyl-peroxy)hexyne-3 (cross-linking agent) | 2 |
| 4,4'-Thiobis(6-tert-butyl-3-methylphenol) | 0.2 |

Each polyethylene composition was extrusion-coated around a 150 mm strand in a thickness of 3, 6, 11 or 23 mm to form an insulating layer, and the thus-formed insulating layer was then subjected to chemical cross-linking using various heating techniques to produce a cable.

Voltage was applied to the cable in the air under the conditions of temperature 90° C. and voltage 7 kv/mm. The time taken for the cable to be broken, i.e., breakdown time, was measured.

The breakdown times of Comparative Examples 1, 2, 3, 4 and 9, which are control examples, are indicated by $T_1$, $T_2$, $T_3$, $T_4$ and $T_9$, respectively. Breakdown times for other examples are shown with that of the corresponding control example (i.e., the thickness of the insulating layer is the same) as a base. For example, in Comparative Examples 5 and 7 in which the thickness of the insulating layer is the same as that of Comparative Example 1, the breakdown time is shown with $T_1$ of Comparative Example 1 as a base.

The results are shown in the Table.

the use of infrared heating or a silicone bath are superior in long term dielectric breakdown characteristics to conventional cables prepared by cross-linking polyethylene with DCP.

A metal layer was provided on the cables of Comparative Example 3 and Example 2, which were further covered with a sheath of polyvinyl chloride (PVC) to prepare cables. These cables were subjected to the same test as above. The breakdown time of the cable prepared using the cable of Example 2 was about ten times that of the cable prepard using the cable of Comparative Example 3.

While the invention has been described in detail and with reference to specific embodiments thereof, it will be apparent to one skilled in the art that various changes and modifications can be made therein without departing from the spirit and scope thereof.

What is claimed is:

1. A cross-linked polyethylene-insulated cable comprising a conductor core, an inner semiconductive layer, an outer semiconductive layer and an insulating layer between said inner semiconductive layer and said outer semiconductive layer, wherein the insulating layer has a thickness of at least 6 mm and is made of a cross-linked polyethylene prepared by a dry cross-linking method with 2,5-dimethyl-2,5-di(tert-butylperoxy)-hexane or 2,5-dimethyl-2,5-di(tert-butylperoxy)hexyne-3 as a cross-linking agent.

2. A cross-linked polyethylene-insulated cable as claimed in claim 1, wherein the cross-linking of the

TABLE

| Run No. | Conductor | Inner Conductive Layer | Outer Conductive Layer | Insulating Layer Composition | Insulating Layer Thickness (mm) | Cross-Linking Method | Testing Method | Breakdown Time |
|---|---|---|---|---|---|---|---|---|
| Comparative Example 1 | *1 | *2 | *3 | I | 3 | Infrared heater | *4 | $T_1$ |
| Comparative Example 2 | " | " | " | " | 11 | Infrared heater | " | $T_2$ |
| Comparative Example 3 | " | " | " | " | 23 | Infrared heater | " | $T_3$ |
| Comparative Example 4 | " | " | " | " | 23 | High pressure steam | " | $T_4$ |
| Comparative Example 9 | " | " | " | " | 6 | Infrared heater | " | $T_9$ |
| Comparative Example 5 | " | " | " | II | 3 | Infrared heater | " | $1.1 \times T_1$ |
| Comparative Example 1 | " | " | " | " | 11 | Infrared heater | " | $6.1 \times T_2$ |
| Comparative Example 2 | " | " | " | " | 23 | Infrared heater | " | $6.0 \times T_3$ |
| Comparative Example 6 | " | " | " | " | 23 | High pressure steam | " | $1.8 \times T_4$ |
| Example 6 | " | " | " | " | 6 | Infrared heater | " | $5.2 \times T_9$ |
| Comparative Example 7 | *1 | *2 | *3 | III | 3 | Infrared heater | *4 | $1.1 \times T_1$ |
| Example 3 | " | " | " | " | 11 | Infrared heater | " | $6.5 \times T_2$ |
| Example 4 | " | " | " | " | 23 | Infrared heater | " | $7.0 \times T_3$ |
| Comparative Example 8 | " | " | " | " | 23 | High pressure steam | " | $1.5 \times T_4$ |
| Example 5 | " | " | " | " | 23 | Silicone bath | " | $6.5 \times T_3$ |

As can be seen from the Table, the cables in which the thickness of the insulating layer is 6, 11 or 23 mm and polyethylene was cross-linked with 2,5-dimethyl-2,5-di(tert-butylperoxy)hexane or 2,5-dimethyl-2,5-di(-tert-butylperoxy)hexyne-3 and a cross-linking agent by polyethylene is performed by dry cross-linking using infrared radiation.

3. A cross-linked polyethylene-insulated cable as claimed in claim 1, wherein the cross-linking of the polyethylene is performed by dry cross-linking using a hot silicone oil bath.

4. A cross-linked polyethylene-insulated cable as claimed in claim 1, wherein the cross-linking of the polyethylene is performed by dry cross-linking using hot inert gas.

5. A cross-linked polyethylene-insulated cable as claimed in claim 1, wherein the cross-linking of the polyethylene is performed by dry cross-linking using a long die.

6. A cross-linked polyethylene-insulated cable as claimed in claim 1, wherein a water-shielding layer, comprising a metal layer laminated with a water-shielding material, is provided around the insulating layer.

* * * * *